No. 12,043. Reissued Oct. 7, 1902.
A. M. LANNER.
STOVE.
(Application filed June 18, 1902.)
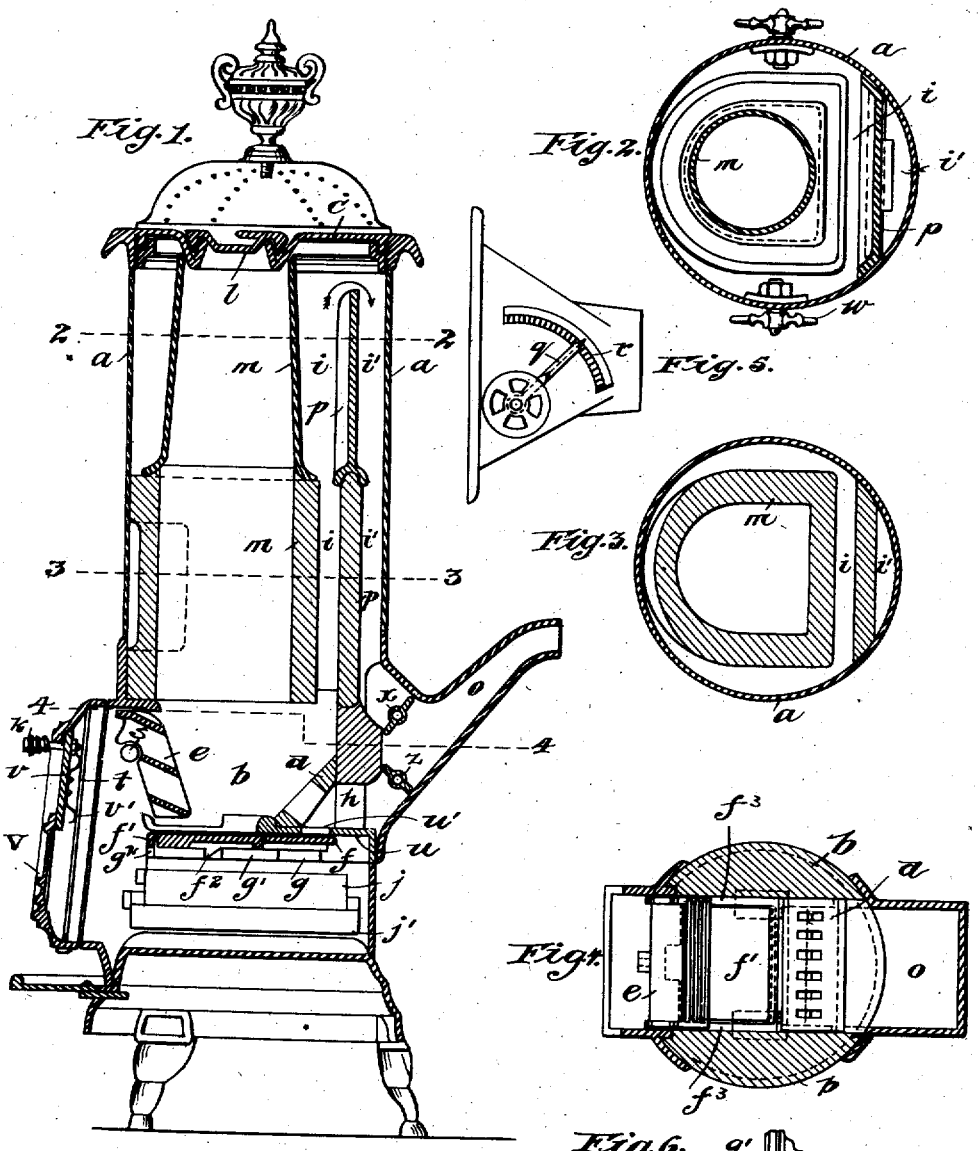
Fig. 5.
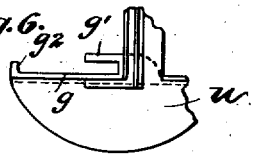
Witnesses,
F. D. Mann,
S. N. Sond
Inventor,
Axel M. Lanner
By Offield, Towle & Linthicum
Attys.

UNITED STATES PATENT OFFICE.

AXEL MAURITZ LANNER, OF STOCKHOLM, SWEDEN.

STOVE.

SPECIFICATION forming part of Reissued Letters Patent No. 12,043, dated October 7, 1902.

Original No. 686,091, dated November 5, 1901. Application for reissue filed June 18, 1902. Serial No. 112,255.

*To all whom it may concern:*

Be it known that I, AXEL MAURITZ LANNER, a citizen of the Kingdom of Sweden and Norway, residing at Stockholm, Sweden, have invented new and useful Improvements in Stoves, of which the following is a specification.

This invention relates to magazine-stoves, and has for its object to provide a construction which will insure a substantially complete combustion of the fuel and a substantially complete utilization of the heat thus produced, whereby great economy and saving of fuel is attained. This object is carried out by a construction and relative arrangement of fire-chamber, grate, and flues, which effects a novel control of the draft across and through that portion of the fuel lying within the fire-chamber.

This invention also has for its object to provide means for effectually and conveniently controlling or regulating the combustion according to the size of the room or set of rooms to be heated and with regard to the variation of the temperature and the draft, so as to secure a uniform and comfortable heat.

In the accompanying drawings, Figure 1 is a central vertical section of the improved stove. Figs. 2, 3, and 4 are horizontal sections on the broken lines 2 2, 3 3, and 4 4, Fig. 1. Fig. 5 is a side view of the valve-chamber, showing the device for holding the valves in any given position. Fig. 6 is a detail view of a part of the fixed bottom plate, showing the support or guide for the plane grate and the stop for limiting its outward movement.

The fire or combustion chamber and flues are constructed, essentially, of fire-brick or partly of cast-iron and are inclosed in an outer metal shell or casing *a*, preferably of blued sheet-steel. The side walls of the fire-chamber consist of blocks *b*, of refractory material, the front and back walls consist of inclined grates *d* and *e*, of cast-iron or fire-bricks, while the bottom consists of a preferably imperforate plane grate or plate *f f'*, of cast-iron, which is adapted to be reciprocated forward and backward in suitable guides *g*. The said plane grate is made in two parts, the rear part *f* of which has two forward-directed projections $f^3$, between which the front part *f'* is pivoted, said front part being sustained by suitable brackets *g'* on the guides, so as to not drop down until pulled outward sufficiently for clearing the said brackets. The fire-chamber is contracted downward on account of the inclined front and rear grates, and the rear part *f* of the plane grate has about the same width as the distance between the lower edges of said inclined grates When the front part *f'* of the plane grate turns down into the ash-pit, the rear part *f* of said plane grate serves as a bottom for the fire-chamber and prevents the fuel from falling down into the ash-pit. In order to stop the outward movement of the plane grate at the proper moment, the said grate is provided with shoulders $f^2$, which are adapted to strike stops $g^2$ on the guides at the limit of its outward movement, the guides being wide enough to permit of the release of the shoulders when the plane grate is lifted a short distance, whereby the insertion and removal of the plane grate is made possible when the stove is empty.

The front inclined grate *e* is pivoted so as to swing inwardly and upwardly upon studs projecting inwardly from the sides of the door-frame or upon a spindle *s*, having bearing in the frame, said stud or spindle being preferably removable, so as to permit of the removal of said grate even in the event that the side blocks *b* sag or become warped from heat.

Above the fireplace and in open communication with it is the fuel-magazine *m*, which extends upwardly to the cover *c*, the latter having an inlet-opening for charging the magazine with fuel. Said opening is preferably surrounded by a channel, so as to receive a flange provided on the under side of the lid *l*, the channel being filled with sand or similar material for preventing the escape of vapors. In some instances the magazine may terminate in a side inlet-opening made in the casing *a*. The magazine is preferably placed somewhat eccentrically in the casing, being nearer the front side than the back side, so that a considerable space is left between the magazine and the back side of the casing. This space is by means of a partition *p*, terminating short of or below the cover, divided into two parts or flues *i i'*, communicating above said partition. One of these flues or uptakes is formed between the partition and the magazine, preferably extending around the latter and communicating directly with the fireplace, while the other is formed between the partition and the back side of the casing and communicates with the outlet or valve chamber *o*. The products of combustion thus will ascend in the flue *i* along the front side of the partition *p* and descend in the flue *i'* along the back side of said partition before escaping into the outlet-chamber *o*, which leads to the chimney.

The back inclined grate *d* rests with its upper edge against the front side of the partition, and behind said grate the partition has an opening or short flue *h*, through which the fireplace communicates more directly with the outlet-chamber *o*. In said chamber *o* are two valves *x z*, one for the short horizontal flue *h* and the other for the longer flue *i i'*, so that both flues can be controlled or regulated independently of each other.

In order to properly control the draft, the valves should be constructed so as as to stay in every given position. This can be effected by means of a plate-spring pointer *q*, fastened to the axis of the valve and pressing against a toothed or radially-rifled ring or sector *r*, provided on the outside of the valve-chamber. As this spring-pointer follows the movement of the valve, the position of the latter can be easily ascertained at any time.

Beneath the fireplace is the ash-pit, which is separated from the fire-chamber by means of a bottom *u*, bearing the guides for the plane grate and having an opening for said plane grate in front of the rear inclined grate *d*. Behind the rear inclined grate is a space formed between it and the partition *p*, and beneath said space are one or more openings *u'* in the bottom *u*, so that air from the ash-pit can enter the fire-chamber through said opening or openings and the back grate *d*, thus providing for the consumption of the carbonic oxid and other combustible products still remaining in the escaping gases. The opening *u'* in the bottom *u* behind the back grate *d* may be more or less closed or opened by shifting the plane grate *f f'* backward or forward.

The door V is hinged to the door-frame and is provided with an opening occupying nearly the whole width and about the upper half of the door, a vertically-sliding shutter *v* being arranged on the inside of said door for closing said opening more or less, and thus regulating the access of fresh air to the fire. By means of springs *v'*, fastened to the shutter and sliding along guides *t*, provided on the door, or by means of other suitable arrangement, the shutter is adapted to remain in any given position. For shifting the shutter the latter is provided with a knob or handle *k*, having a wire spiral, between the windings of which air can circulate for cooling the same. This handle also can be used for opening the door when necessary.

It will be seen that the opening of the door is situated in front of the fire and that the whole front side of the latter can be uncovered without opening the door by pushing down the shutter to its lowest position. Live coals or cinders accidentally dropping from the front grate will be caught by the lower part of the door, and thereby prevented from falling on the floor. In all positions the shutter is totally inclosed within the margins of the door, and thus never mars the appearance of the latter or of the stove. When the door is closed, all air entering into the stove must pass through the opening in the door above the upper edge of the shutter. The air then partly passes directly to the fire through the front inclined grate *e* and partly descends along said grate and passes through the ash-pit along the under side of the plane grate, and finally ascends through the bottom *u* behind the rear inclined grate. The air taking this latter course will be highly heated by contact with the front inclined and plane grates, and thus will be placed in the best possible condition to insure a substantially complete combustion of the carbonic oxid and other combustible substances in the escaping gases.

In the ash-pit are two pans *j* and *j'*, of sheet metal or castings, the one above or within the other for receiving the ashes. The bottom of the upper pan is perforated or consists of a wire sieve, so that the ashes can be riddled from the fuel not completely consumed and the latter brought into the magazine again.

When the door is open, coal or cinders accidentally falling out will drop upon the plate *n*, situated under the door-frame, said plate having an upward-directed rim for preventing the coals from rolling down to the floor. In order to facilitate the cleaning of said plate, it is made loose, so that it can easily be taken away at any time, the inner margin having one or more projections *n'*, that enter recesses in the lower cast part of the stove.

About the middle of the stove there are on the outside two opposite lugs or handles *w* for facilitating the lifting or transportation thereof when necessary.

The principal features of this invention can be applied to stoves, furnaces, and ranges.

From the foregoing description, taken in connection with the accompanying drawings, the principle, construction, and mode of operation of my improved stove will be readily understood. Through the manipulation of the valves *x* and *z* and the control of the openings *u'* in the manner described the draft can be directed through and across the fuel in the fire-chamber in a variety of ways. By closing the valve *x* and opening the valve *z* the draft will be directly across the base of the fuel in the fire-chamber through the front grate *e*, the back grate *d*, and the short flue *h*. This is especially advantageous for the purpose of conveniently and rapidly kindling the fire when the magazine is entirely filled with fuel, since the openings of the front grate *e* may be filled with kindling, the fire from which is drawn by the direct draft directly across and through the fuel in the fire-chamber, to which result the completely-closed bottom grate obviously contributes by causing the entire draft to pass laterally through and across the fuel in order to reach the chimney-flue. After the fire is started the direct draft may be cut off by closing the valve *z* and the circulating-draft flue opened by opening the valve *x*, whereupon the draft will be upwardly across the fire-chamber by way of the flues *i i'*. The effect of this draft in generating and maintaining combustion within the fire-chamber may be tempered as desired by a regulation of the opening *u'*, with a simultaneous opening of the valve *z*. When it is desired to check combustion in a moderate degree, the opening *u'* will be exposed partially, the valve *z* being kept open; but when it is desired to still further limit the combustion, the valve *z* will be maintained open concurrently with the complete exposure of the opening *u'*, whereby in either case a portion of the draft will pass directly from the ash-pit to the chimney by way of opening *u'*, flue *h*, and chimney-flue *o*, thereby diminishing the intensity of combustion in the fire-chamber.

A stove constructed in accordance with my invention is free from the inconveniences—such as smoking, smelling, &c.—with which most stoves hitherto used have been encumbered, and it burns everything economically, from the best anthracite to the cheapest rubbish of bituminous coal, bark, wood, sawdust, &c. It acts also as a good ventilator and does not at all deteriorate the air in the room, so that living plants will thrive splendidly without using water vessels or other evaporating devices, and, moreover, the operation of lighting, attending, cleaning, and filling the stove is a most simple and convenient one and very easily learned. The fire can be made (or started) without emptying the stove.

I claim—

1. A stove, range or furnace having a fire-chamber, an ash-pit, an outlet-flue, a partition between the ash-pit and outlet-flue and provided with an air-opening, and a grate movable to control said opening, substantially as set forth.

2. A stove, range or furnace having a fire-chamber, an ash-pit, an outlet-flue, a partition between the ash-pit and outlet-flue and provided with an air-opening, and a reciprocating grate controlling said opening, substantially as set forth.

3. A stove, range or furnace having a fire-chamber, a grate, a door giving access to the fire-chamber and provided with a shutter, and a swinging grate-section in line with said shutter and between the door and fire-chamber, substantially as set forth.

4. A stove, range or furnace having a fire-chamber, an ash-pit, an outlet-flue at the rear of the fire-chamber, a door at the front of the fire-chamber, a partition between the rear portion of the ash-pit and outlet-flue and provided with an air-opening, a bottom grate movable to control said opening, and front and rear grate-sections between the fire-chamber and door and said chamber and the flue, said front grate-section being movably mounted, substantially as set forth.

5. A stove, range or furnace having a fire-chamber, an ash-pit, an outlet-flue at the rear of the fire-chamber, a door at the front of the fire-chamber, a partition between the rear portion of the ash-pit and outlet-flue and provided with an air-opening, a bottom grate movable to control said opening, and front and rear grate-sections between the fire-chamber and door and said chamber and the flue, said front grate-section being movably mounted, vertical up and down take flues in communication with the fire-chamber and outlet-flue, and valves in the downtake and outlet flues, substantially as set forth.

6. A stove, range or furnace having a fire-chamber, an ash-pit, an outlet-flue at the rear of the fire-chamber, a door at the front of the fire-chamber, a partition between the rear portion of the ash-pit and outlet-flue and provided with an air-opening, a grate movable to control said opening, a vertical rear partition forming with the stove-body up and down take flues in communication with the fire-chamber and outlet-flue, and valves governing said flues, substantially as set forth.

7. In a base-burner stove, the combination with an upright fuel-chamber having a lateral grate-section at the lower end thereof, means for admitting draft through said lateral grate-section, a direct-draft passage leading from the fuel-chamber opposite the lateral grate-section, and a circulating-draft passage leading from the fuel-chamber opposite the lateral grate-section and in the vicinity of the direct passage.

8. In a base-burner stove, the combination with an upright fuel-chamber having a lateral grate-section at the lower end thereof, means for admitting draft through said lateral grate-section, a direct-draft passage leading from the fuel-chamber opposite the lateral grate-section, and a circulating-draft passage leading from the fuel-chamber opposite the lateral grate-section and in the vicinity of the direct passage, means for controlling the admission of air through said lateral grate and means for controlling the direct-draft and circulating-draft passages to the chimney.

9. In a base-burner stove, the combination with an upright fuel-chamber provided at the lower portion thereof with a lateral front grate-section, an ash-pit located immediately below said chamber, a grate arranged to control the passage of air from the ash-pit to the fuel-chamber, means for admitting draft through the lateral front grate-section and to the ash-pit, a direct-draft flue leading from the fuel-chamber at a point opposite the front grate, an indirect or circulating-draft passage leading from the fuel-chamber in the vicinity of the direct-draft flue, and means for controlling each of said draft-passages, for the purpose set forth.

10. In a base-burner stove, the combination with an upright fuel-chamber, of a normally closed grate forming the bottom of said fuel-chamber, a normally open movable grate forming a portion of the front side of the fuel-chamber at the lower end thereof, an ash-pit located below said bottom grate, means for admitting air through said lateral front grate and to said ash-pit, a controlled passage leading from the ash-pit to the rear part of the fuel-chamber opposite the front grate thereof, a direct-draft flue leading from the rear side of the fuel-chamber and opposite the front grate, and a circulating-draft passage leading from the vicinity of the direct passage upwardly within the stove and back to a common chimney-passage, and dampers controlling said direct and circulating draft passages, for the purpose set forth.

AXEL MAURITZ LANNER.

Witnesses:

J. A. G. WEDELIN,

A. ROMELL.